(12) United States Patent
Anderson (10) Patent No.: US 6,833,826 B1
(45) Date of Patent: Dec. 21, 2004

(54) HUMAN-COMPUTER INTERFACE

(75) Inventor: Thomas G. Anderson, Albuquerque, NM (US)

(73) Assignee: Novint Technologies, Inc., Albuquerque, NM (US)

( * ) Notice: Subject to any disclaimer, the term of this patent is extended or adjusted under 35 U.S.C. 154(b) by 237 days.

(21) Appl. No.: 09/638,186

(22) Filed: Aug. 14, 2000

Related U.S. Application Data (60) Provisional application No. 60/202,448, filed on May 6, 2000.

(51) Int. Cl.[7] ................................................. G09G 5/08
(52) U.S. Cl. ........................................................ 345/163
(58) Field of Search ................................ 345/157, 156, 345/158, 159, 161, 163, 419, 424

(56) References Cited

U.S. PATENT DOCUMENTS

| | | | |
|---|---|---|---|
| 5,296,871 A | | 3/1994 | Paley |
| 5,459,382 A | | 10/1995 | Jacobus et al. |
| 5,506,605 A | | 4/1996 | Paley |
| 5,576,727 A | | 11/1996 | Rosenberg et al. |
| 5,629,594 A | | 5/1997 | Jacobus et al. |
| 5,734,373 A | | 3/1998 | Rosenberg et al. |
| 5,739,811 A | | 4/1998 | Rosenberg et al. |
| 5,808,601 A | * | 9/1998 | Leah et al. .................. 345/856 |
| 5,825,308 A | | 10/1998 | Rosenberg et al. |
| 5,831,408 A | | 11/1998 | Jacobus et al. |
| 5,844,392 A | | 12/1998 | Peurach et al. |
| 5,889,670 A | | 3/1999 | Schuler et al. |
| 5,956,484 A | | 9/1999 | Rosenberg et al. |
| 6,028,593 A | | 2/2000 | Rosenberg et al. |
| 6,101,530 A | | 8/2000 | Rosenberg et al. |
| 6,113,395 A | * | 9/2000 | Hon ........................... 434/262 |
| 6,125,385 A | | 9/2000 | Wies et al. |
| 6,131,097 A | | 10/2000 | Peurach et al. |
| 6,211,861 B1 | * | 4/2001 | Rosenberg et al. ......... 345/163 |
| 6,219,032 B1 | * | 4/2001 | Rosenberg et al. ......... 345/157 |
| 6,292,174 B1 | * | 9/2001 | Mallett et al. .............. 345/163 |
| 6,433,775 B1 | * | 8/2002 | Gould et al. ................ 345/157 |
| 6,552,722 B1 | * | 4/2003 | Shih et al. .................. 345/419 |

* cited by examiner

*Primary Examiner*—Amare Mengistu
(74) *Attorney, Agent, or Firm*—V. Gerald Grafe (57) ABSTRACT

The present invention provides a method of human-computer interfacing. Force feedback allows intuitive navigation and control near a boundary between regions in a computer-represented space. For example, the method allows a user to interact with a virtual craft, then push through the windshield of the craft to interact with the virtual world surrounding the craft. As another example, the method allows a user to feel transitions between different control domains of a computer representation of a space. The method can provide for force feedback that increases as a user's locus of interaction moves near a boundary, then perceptibly changes (e.g., abruptly drops or changes direction) when the boundary is traversed.

15 Claims, 5 Drawing Sheets

HUMAN-COMPUTER INTERFACE

PRIORITY CLAIM

This application claims the benefit of U.S. Provisional Application No. 60/202,448, filed on May 6, 2000.

This invention was made with Government support under Contract DE-AC04-94AL85000 awarded by the U. S. Department of Energy. The Government has certain rights in the invention.

BACKGROUND OF THE INVENTION

This invention relates to the field of human-computer interfaces, specifically those relating to haptics, multidimensional displays and navigation, interaction with multidimensional environments and objects, and methods of intuitively interfacing therewith.

Computing technology has seen a many-fold increase in capability in recent years. Processors work at ever higher rates; memories are ever larger and always faster; mass storage is larger and cheaper every year. Computers now are essential elements in many aspects of life, and are often used to present three dimensional worlds to users, in everything from games to scientific visualization.

The interface between the user and the computer has not seen the same rate of change. Screen windows, keyboard, monitor, and mouse are the standard, and have seen little change since their introduction. Many computers are purchased with great study as to processor speed, memory size, and disk space. Often, little thought is given to the human-computer interface, although most of the user's experience with the computer will be dominated by the interface (rarely does a user spend significant time waiting for a computer to calculate, while every interaction must use the human-computer interface).

As computers continue to increase in capability, the human-computer interface will become increasingly important. The effective bandwidth of communication with the user will not be sufficient using only the traditional mouse and keyboard for input and monitor and speakers for output. More capable interface support will be desired to accommodate more complex and demanding applications. For example, six degree of freedom input devices, force and tactile feedback devices, three dimensional sound, and stereo or holographic displays can improve the human-computer interface.

As these new interface capabilities become available, new interface methods are needed to fully utilize the new modes of human-computer communication enabled. Specifically, new methods of interaction can use the additional human-computer communication paths to supplement or supplant conventional communication paths, freeing up traditional keyboard input and visual feedback bandwidth. The use of force feedback, or haptics, can be especially useful in allowing a user to feel parts of the interface, reducing the need for a user to visually manage interface characteristics that can be better managed by feel. Users interfacing with non-computer tasks routinely exploit the combination of visual and haptic feedback (seeing one side of a task while feeling the other); bringing this sensory combination into human-computer interfaces can make such interfaces more efficient and more intuitive for the user. Accordingly, there is a need for new methods of human-computer interfacing that make appropriate use of haptic and visual feedback.

SUMMARY OF THE INVENTION

The present invention provides a method of human-computer interfacing. Force feedback allows intuitive navigation and control near a boundary between regions in a computer-represented space. For example, the method allows a user to interact with a virtual craft, then push through the windshield of the craft to interact with the virtual world surrounding the craft. As another example, the method allows a user to feel transitions between different control domains of a computer representation of a space. The method can provide for force feedback that increases as a user's locus of interaction moves near a boundary, then perceptibly changes (e.g., abruptly drops or changes direction) when the boundary is traversed.

Advantages and novel features will become apparent to those skilled in the art upon examination of the following description or may be learned by practice of the invention. The objects and advantages of the invention may be realized and attained by means of the instrumentalities and combinations particularly pointed out in the appended claims.

DESCRIPTION OF THE FIGURES

The accompanying drawings, which are incorporated into and form part of the specification, illustrate embodiments of the invention and, together with the description, serve to explain the principles of the invention.

DETAILED DESCRIPTION OF THE INVENTION

The present invention provides a method of human-computer interfacing. Force feedback allows intuitive navigation and control near a boundary between regions in a computer-represented space. For example, the method allows a user to interact with a virtual craft, then push through the windshield of the craft to interact with the virtual world surrounding the craft. As another example, the method allows a user to feel transitions between different control domains of a computer representation of a space. The method can provide for force feedback that increases as a user's locus of interaction moves near a boundary, then perceptibly changes (e.g., abruptly drops or changes direction) when the boundary is traversed.

Interfacing with Multiple Domains

Figure 1:
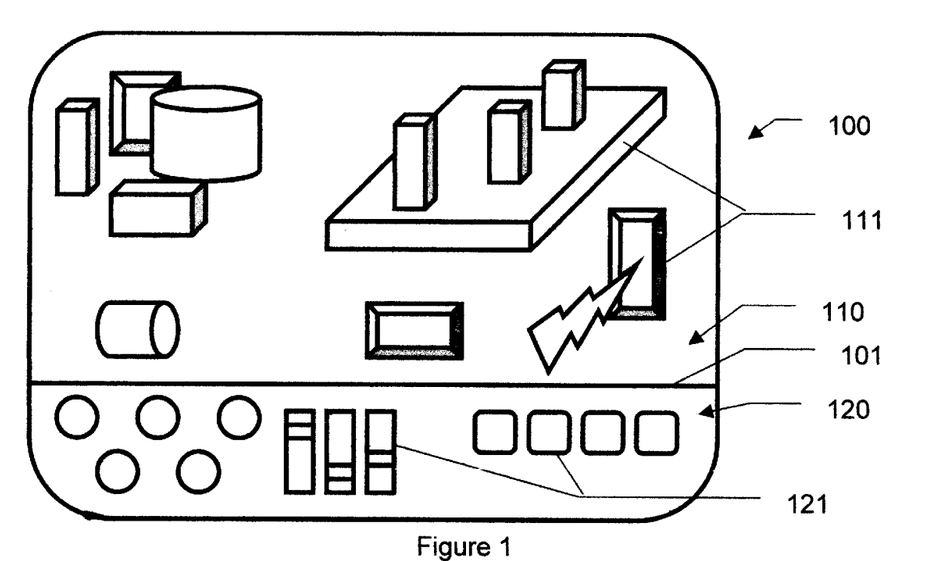
FIG. 1 is a schematic representation of a computer-represented space having two domains with an intervening boundary.

FIG. 1 is a schematic representation of a computer-represented space 100 having two domains 110, 120 with an intervening boundary 101. The domains can contain whatever information is meaningful for the intended use. There can also be arbitrarily many domains: represented as subsets of a single display or linked together so that moving into one domain makes neighboring domains accessible. As an example, the figure shows a first domain 110 having representations of objects 111 therein. A second domain 120 has representations of various controls 121. Interaction with the two domains can involve different modes of interfacing; for example, an action that moves a control 121 in the second domain 120 can select an object 111 in the first domain 110. The user can indicate which domain is currently active by indicating a user locus of interaction, for example by moving a mouse, a force-enabled input device, or other suitable input device. Visual feedback such as a representation of a cursor can help the user reliably know which domain is active. When the user locus of interaction is near a boundary 101 between the two regions, however, visual feedback can be insufficient. Reliance on visual feedback can distract the user from the application of interest, however, making it undesirable in some applications.

Haptic Representation of Domain Boundaries

Figure 2A:
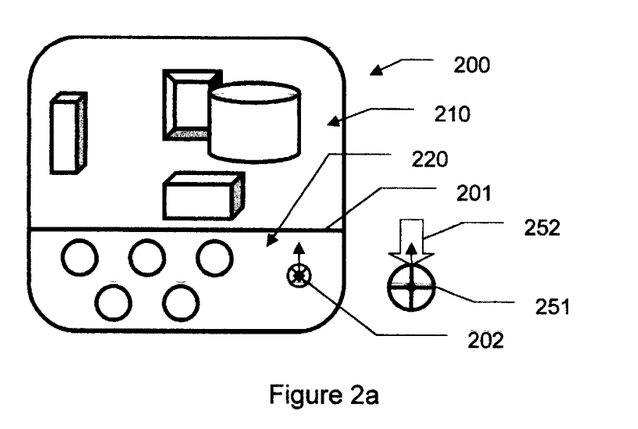
FIG. 2 is a schematic representation of a forces applied to a user-controlled pointer object as the user locus of interaction moves in the vicinity of a boundary between two domains of a computer-represented space.
Figure 2B:
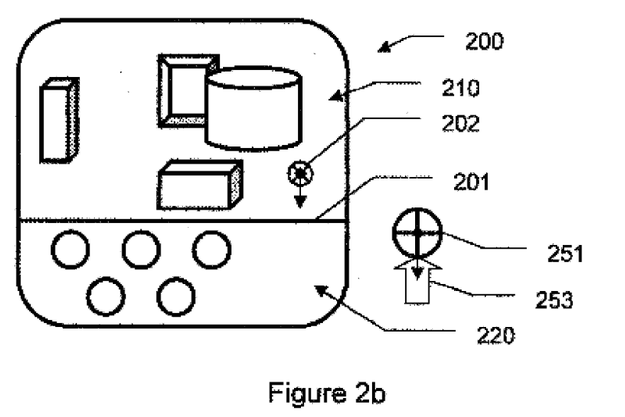

The present invention accordingly provides for force feedback to help the user intuitively control the active domain, and manage transitions between the two domains. FIGS. 2(a,b) illustrates suitable feedback forces. In the figure, a computer-represented space 200 comprises a first domain 210 and a second domain 220. A boundary 201 is defined between the two domains. The figure depicts the boundary 201 as a visible line; the force feedback aspect of the present invention works even if the boundary is not visible. In FIG. 2a, the user locus of interaction, indicated by cursor symbol 202, is near and moving toward boundary 201. The user can control the locus of interaction with a user input device, for example devices including those marketed under trade names such as the Phantom from Sensable Technologies, the pencat pro from Haptic Technologies, a spaceball, a standard mouse, magnetic trackers, acoustic trackers, mechanical trackers, inertial trackers, a force feedback joystick, a force feedback mouse, and many other computer gaming input devices. As the locus moves nearer boundary 201, a force 252 directed substantially away from boundary 201 is fed back to the input device, giving the user a haptic indication of the approaching boundary. If the user does not desire to transition between domains, the force feedback allows the user to feel the boundary and avoid crossing it. If the user does desire a transition between domains, the feedback force lets the user feel the boundary and push through it, at which time the force can be reduced, providing the user a positive indication of the transition.

FIG. 2b shows the same computer representation with the locus of interaction in the first domain 210. As the user causes the input device to move the locus of interaction toward the boundary 201, a feedback force 253 directed substantially away from the boundary 201 is fed back to the user via the input device. As in the example of the previous figure, the feedback force allows the user to feel the boundary and either avoid a transition or positively effect one. The attention that would otherwise be required to visually manage the locus of interaction is now available for other user control of the computer, making the overall interface more intuitive and more effective.

Craft Navigation as an Interface Domain

Figure 3:
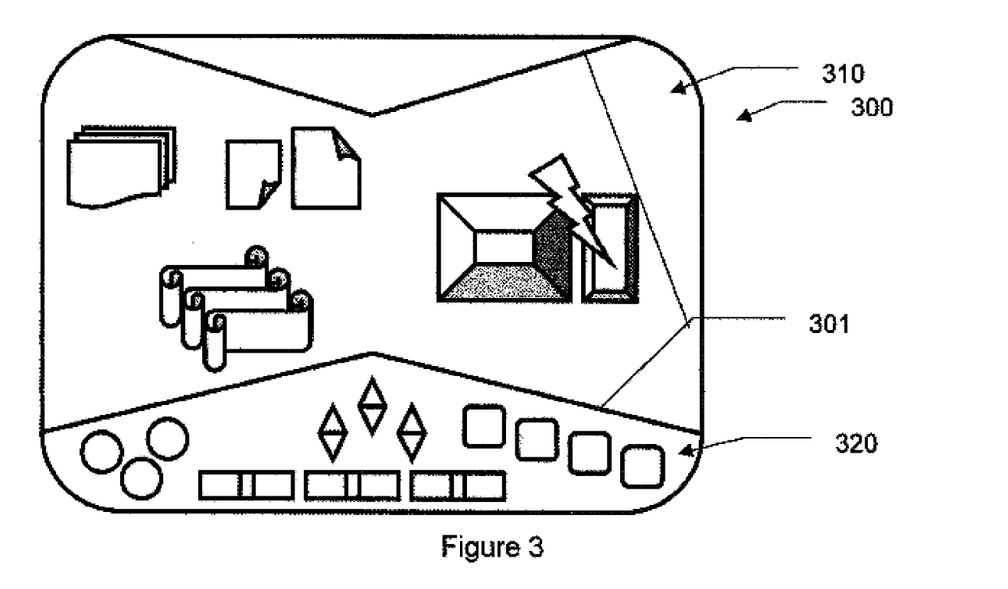
FIG. 3 is a schematic representation of a computer-represented space having a craft representation suitable for navigation in the space.

A craft metaphor has been found to be useful in navigating some computer-represented spaces. In a craft metaphor, the user navigates in a multidimensional space inside a craft, where the craft moves with the user as the user moves through the space. Other intuitive metaphors having a multidimensional space and a personal domain (that moves with the user through the multidimensional space) can also be suitable, for example a desk or a toolbelt can accompany the user through a multidimensional space. The present invention can be used with such a metaphors, for example by treating a craft as one domain and the space outside the craft as another domain. FIG. 3 is a schematic representation of a computer-represented space 300 having a craft representation 320 suitable for navigation in the space. The user can interact with controls in the craft to control navigation through the space. The craft metaphor can include a windshield, represented in the figure by upper and lower boundaries 301. Using similar force feedback as described for the previous example, the user can move the locus of interaction to the windshield (transparent in the figure). Feeling the windshield, the user can move away therefrom and remain in the craft. If the user desires to interact with the space surrounding the craft, the user can push through the feedback force near the windshield. The user accordingly is presented with a windshield that can be pushed through to get out of the craft, allowing intuitive control of both the craft and transitions between the craft and the surrounding space. Once out of the craft, the user can again feel the windshield as the locus of interaction approaches the windshield. The user can use the force feedback to feel around the craft, or to pop back into the craft to once again navigate.

Accommodating Input Devices with Finite Ranges of Motion

Figure 4A:
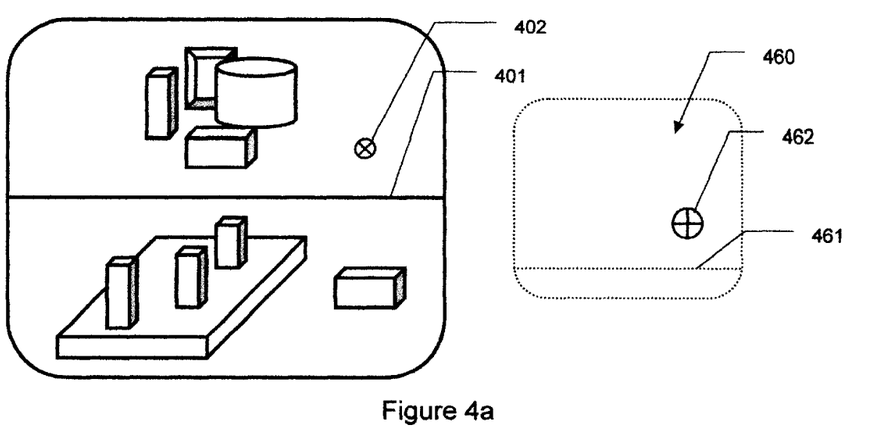
FIG. 4 is a schematic representation of changing correspondence of a boundary with the range of motion of a pointer object as the locus of interaction moves between two domains in a computer-represented space.
Figure 4B:
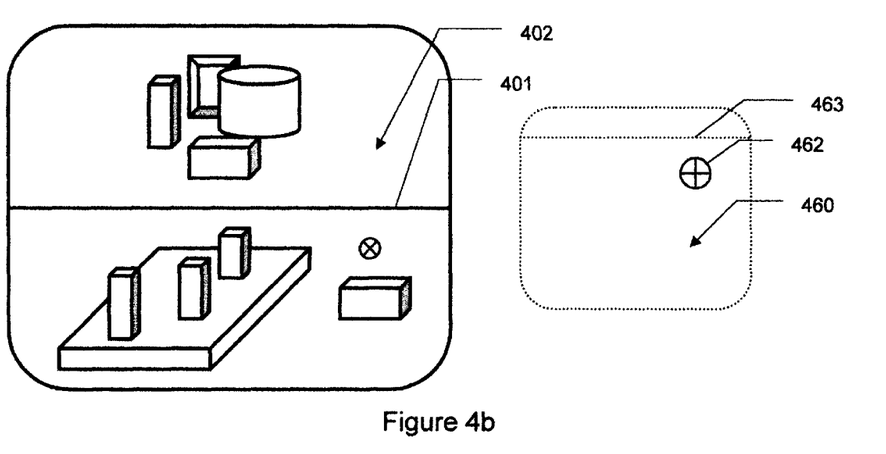

Allowing haptic feedback of transitions between domains can allow more efficient use of the available range of motion of an input device. Since the user is able to feel a perceptible change in force feedback when the locus of interaction transitions between domains, most of the range of motion of the input device can be mapped to the current active domain. When the user pushes through the boundary to another domain, the transition felt by the user can also trigger a remapping of the range of motion of the input device so that most of the range now corresponds to the newly active domain. FIGS. 4(a,b) is a schematic representation of changing correspondence of a boundary with the range of motion of a pointer object as the locus of interaction moves between two domains in a computer-represented space. In FIG. 4a, the locus of interaction 402 is within a first domain, represented above the boundary 401 in the figure. The input device is shown in the figure as symbol 462; it is shown as having a bounded range of motion 460. The boundary 401 in the representation is mapped to a portion of the range of motion indicated by line 461. The user can move the input device anywhere in the range of motion 460 above the mapped boundary 461. As the input device approaches the mapped boundary 461, the user feels the feedback force. If the user pushes through the mapped boundary 461, then the locus of interaction shifts to the other domain, as shown in FIG. 4b. Once the user has felt the transition to the second domain, the range of motion of the input device can be remapped so that the domain boundary 401 now corresponds to the line 463 in the input device range of motion. Most of the input device range of motion is now available to the user in interfacing with the second domain. The use of feedback force to allow haptic control of transitions between domains accordingly allows more efficient use of input devices with limited ranges of motion (as examples, the device, or the user, or the workspace can have limits that benefit from remapping).

As an example, when the user is interfacing with the first domain the boundary can correspond to a region near a first extreme of the range of motion of the user's control of the locus, and when the user is interfacing with the second domain the boundary can correspond to a region near a second extreme of the range of motion of the user's control of the locus. As another example, when the user is interfacing with the personal space, the boundary between the personal space representation and the virtual world can correspond to a region near a first extreme of the range of motion of the pointer object, and, when the user is interfacing with the virtual space, the boundary between the personal space representation and the virtual space can correspond to a region near a second extreme of the range of motion of the pointer object. The first extreme can be substantially opposite the second extreme.

Remapping can also be useful in extending the range of domains available to the user. A user interacting with a first domain can have accessible boundaries with second and third domains. Transitioning across the boundary to the second domain, the user could then have accessible a boundary back to the first domain and a boundary to a fourth domain, not accessible from the first or third domains. Similarly, the third domain can have accessible boundaries to the first domain, and to other domains specific to the third domain. As an example, one domain can be an application domain and a second domain a control domain. When in the application domain, most of the display and most of the input device range of motion can be devoted to the application display, with a small portion used for the boundary to the control domain. Transitioning to the control domain can allow more of the display and input device range of motion to be devoted to the controls, including to boundaries to other domains (for example, to other control-like domains not accessible directly from the application domain).

Feedback Force Profiles

Figure 5:
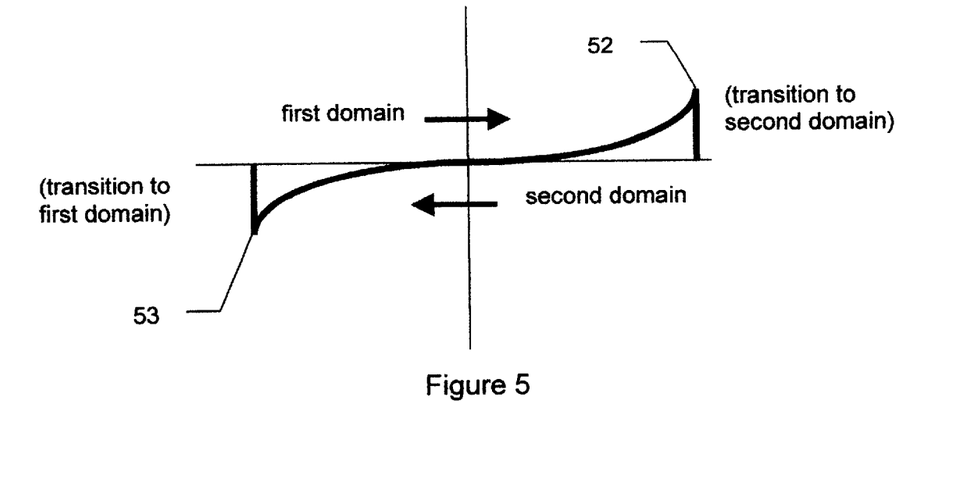
FIG. 5 is a graph of feedback force applied to a pointer object in the vicinity of a boundary.

The specific force profile presented to the user as the locus of interaction approaches, matches, and passes a boundary can be important. FIG. 5 illustrates some general characteristics of such a feedback force profile. The domain where the locus lies and the distance from the locus to the boundary determine the feedback force. The upper portion of the graph represents the feedback force when the locus is in a first domain, moving toward a boundary. The user moves into the second domain when the locus is moved past the point 52 of greatest feedback force. The lower portion of the graph represents the feedback force when the user is in the second domain. The user moves into the first domain when the locus moves past the point 53 of greatest feedback force.

When the locus of interaction is far from the boundary, represented by the ends of the graph, the feedback force can be very low. Often, the feedback force due to the boundary can be zero at sufficient distances from the boundary, allowing full use of the force feedback bandwidth for other interfacing. As the locus approaches the boundary, the feedback force can be increased then decreased as the locus pushes past the boundary.

The force can be gradually increased as shown in the figure, or can be increased quickly, depending on the user interface characteristic desired. A gradual increase can let the user feel encouraged into the active domain; a rapid increase can give a user an impression of moving freely until hitting a wall (the boundary). As the locus crosses the boundary, the feedback force can be reduced quickly, giving the user a haptic sense of having broken through the boundary. That haptic impression can be important to clearly communicating to the user that the boundary has been crossed. Once the locus passes the boundary, the force profile moves to the other side of the axis (indicating force in the opposite direction). If the two profiles overlap, then the locus will be pushed away from the boundary after it pushes through. If the profiles do not overlap (as the figure shows), then the boundary will not affect the locus once it is pushed through until the user moves back into the barrier.

The resistive force when the locus is in the first domain can comprise the following profile:
a) Substantially zero when the locus is outside a first border portion of the first domain corresponding to that portion of the first domain within a threshold distance from a first boundary representing a boundary for transitions from the first domain to the second domain;
b) Increases from zero to a maximum value as the locus moves within the first border portion to the first boundary;
c) Decreases to substantially zero as the locus moves past the first boundary.

The resistive force when the locus is in the second domain can comprise the following example profile:
a) Substantially zero when the locus is outside a second border portion of the second domain corresponding to that portion of the second domain within a threshold distance from a second boundary representing a boundary for transitions from the second domain to the first domain;
b) Increases from zero to a maximum value as the locus moves within the second border portion to the second boundary; p1 c) Decreases to substantially zero as the locus moves past the second boundary.

As another example, the force can be at a minimum when the pointer apparatus representation is distant from the boundary, and where the force can be at a maximum when the pointer apparatus representation is near the boundary.

Other haptic forces can be canceled or reduced when the locus first transitions across a boundary to reduce unexpected user forces. For example, if the user pushes through a boundary at a point corresponding to the interior of a solid object, the force feedback could apply significant, unexpected forces to the user input device (pushing the cursor away from the center of the solid object). To avoid such a user surprise, the other haptic forces can be reduced, then gradually restored to the full value. This allows a user time to adjust to the forces of the new domain before they are applied at full strength. Scaling all feedback forces by a function that increases with time from a boundary transition can accomplish the desired effect. As an example, feedback to the user in a domain can be diminished by scaling feedback by a function that increases with time elapsed since the most recent domain transition.

Some transitions across boundaries can lead to a visual cursor (the locus as represented in the visual display) or haptic cursor (the locus as represented in the force feedback field of the domain) corresponding to locations off the visible portion of the domain. Feedback forces can be applied to the user input device to encourage the out-of-sight or out-of-touch cursor back into the appropriate portion of the domain, making the transition between domains more intuitive.

The interface can also provide a visual track of the cursor motion across the boundary. For example, the pre-transition position can remain on the display, and a trail shown from there to the new position. The trail and pre-position display can persist long enough to allow the user to visually appreciate the transition.

Implementation

A human-computer interface incorporating the present invention was implemented in OpenGL (an open standard) and C, and has been tested on windows NT and SGI IRIX computers, including used SGI Indigo II, SGI Onyx, SGI Octane, and several NT computers. The present invention should be suitable for use with Macs, Windows 95 and 98, other unix, and linux computer systems.

Figure 6:
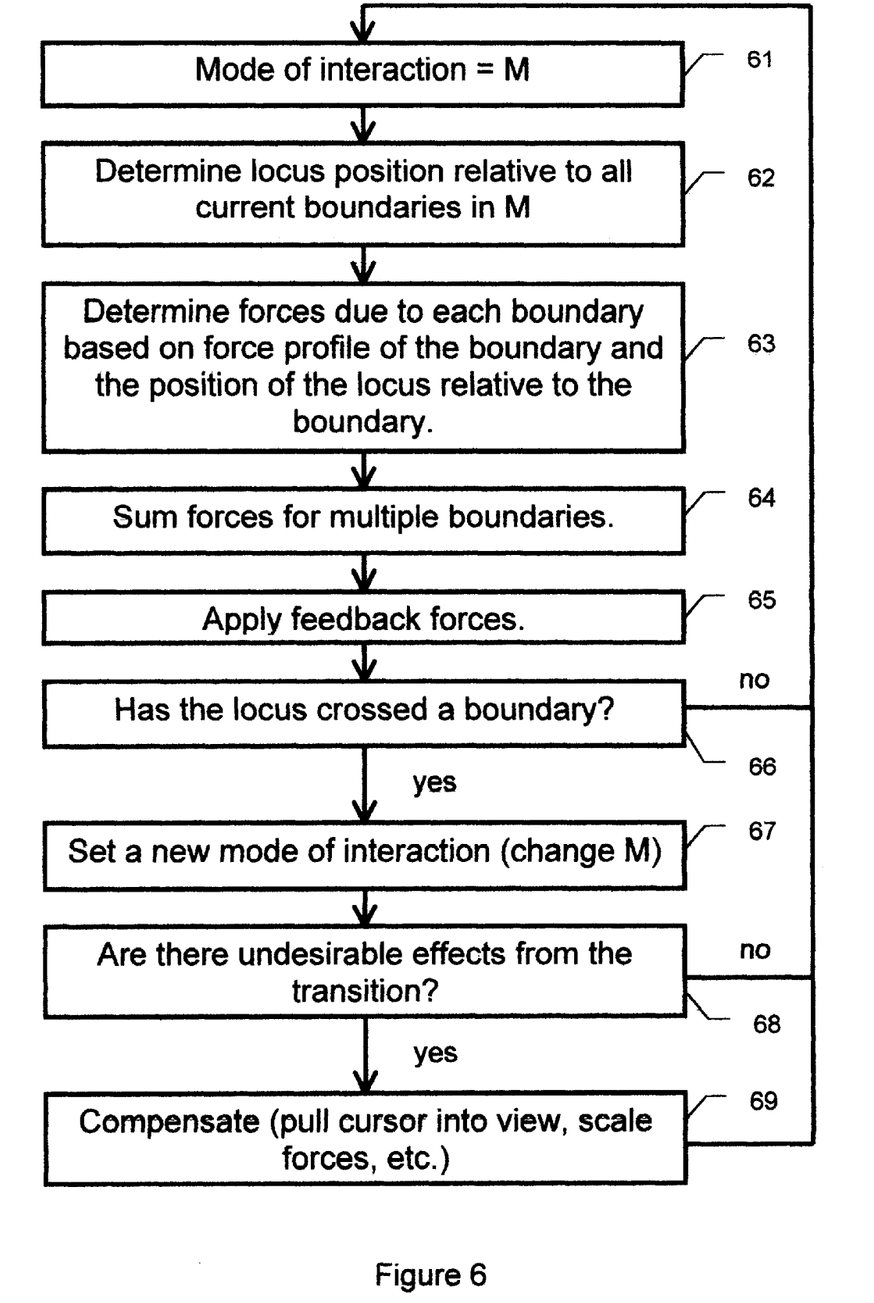
FIG. 6 is a flow diagram of a software implementation of the present invention.

The force feedback associated with domain boundaries can be implemented as shown in the flow diagram in FIG. 6. The currently active domain, and its mode of interaction, is denoted M in the FIG. 61. The position of the locus relative to boundaries accessible in the current domain is determined 62. Forces due to each boundary can then be determined based on the force profile corresponding to M (each domain can have its own force profiles), the specific boundary (different boundaries can be associated with different force profiles), and the position of the locus relative to the specific boundary 63. The net feedback force on the input device can be determined by combining the forces from each boundary, for example by simply summing the forces 64. The net force can be applied to the input device 65. The locus position might indicate that it has passed a boundary 66. If not, then the current position of the locus is used to repeat the force determination in the current domain 61. If the locus has passed a boundary, then a new mode of interaction (change of M) can be set 67. If there are undesirable effects from the boundary crossing (e.g., out-of-view cursors, extreme feedback forces) 68, then those effects can be compensated 69 before repeating the feedback force determination 61.

The particular sizes and equipment discussed above are cited merely to illustrate particular embodiments of the invention. It is contemplated that the use of the invention may involve components having different sizes and characteristics. It is intended that the scope of the invention be defined by the claims appended hereto.

What is claimed is:

1. A method of allowing a user using an input device to interface with two domains in a three-dimensional computer environment, which environment comprises a display presenting a display plane to the user, comprising:
   a) determining the position relative to the display plane of a user's locus of interaction, which position is moveable over a range of motion bounded by extremes thereof;
   b) determining which domain corresponds to the position;
   c) interfacing to the user according to the determined domain;
   d) as the position of the locus moves toward a boundary for transition from the determined domain to the other domain, applying a resistive force to the input device resisting further motion toward the boundary; and
   e) if the position of the locus moves past the boundary, then reducing the resistive force by a perceptible amount.

2. The method of claim 1, wherein the position of said boundary is dependent upon which domain contains the locus.

3. The method of claim 1, wherein feedback to the user in a domain is diminished for a time after a transition between domains.

4. The method of claim 1, wherein feedback to the user in a domain is diminished by scaling feedback by a function that increases with time elapsed since the most recent domain transition.

5. The method of claim 1, wherein the first domain makes accessible to the user a boundary to a third domain, and wherein the second domain does not make accessible to the user a boundary to said third domain.

6. The method of claim 1 wherein the interface to the user depends on which domain contains the locus.

7. A method of allowing a user using an input device to interface with two domains in a computer environment, comprising:

a) determining the position of a user's locus of interaction;
b) determining which domain corresponds to the position;
c) interfacing to the user according to the determined domain;
d) as the position of the locus moves toward a boundary for transition from the determined domain to the other domain, applying a resistive force to the input device resisting further motion toward the boundary, wherein the resistive force when the locus is in the first domain is:
   i) Substantially zero when the locus is outside a first border portion of the first domain corresponding to that portion of the first domain within a threshold distance from a first boundary representing a boundary for transitions from the first domain to the second domain;
   ii) Increases from zero to a maximum value as the locus moves within the first border portion to the first boundary;
   iii) Decreases to substantially zero as the locus moves past the first boundary; and
e) if the position of the locus moves past the boundary, then reducing the resistive force by a perceptible amount.

8. The method of claim 7, wherein the resistive force when the locus is in the second domain is:
   a) Substantially zero when the locus is outside a second border portion of the second domain corresponding to that portion of the second domain within a threshold distance from a second boundary representing a boundary for transitions from the second domain to the first domain;
   b) Increases from zero to a maximum value as the locus moves within the second border portion to the second boundary;
   c) Decreases to substantially zero as the locus moves past the second boundary.

9. A method of allowing a user using an input device to interface with two domains in a computer environment, comprising:
   a) determining the position of a user's locus of interaction, where the user's control of the locus is moveable over a range of motion bounded by extremes thereof;
   b) determining which domain corresponds to the position;
   c) interfacing to the user according to the determined domain;
   d) as the position of the locus moves toward a boundary for transition from the determined domain to the other domain, applying a resistive force to the input device resisting further motion toward the boundary; and
   e) if the position of the locus moves past the boundary, then reducing the resistive force by a perceptible amount;
   f) wherein, when the user is interfacing with the first domain the boundary corresponds to a region near a first extreme of the range of motion of the user's control of the locus, and when the user is interfacing with the second domain the boundary corresponds to a region near a second extreme of the range of motion of the user's control of the locus.

10. A method of communicating to a user the position of a point of user focus relative to a boundary in a computer environment, comprising applying force to a user controlled focus object, where the force is directed away from the boundary, wherein the force is:

a) Substantially zero when the point of user focus is outside a border region corresponding to a region within a threshold distance from said boundary;
b) Increases from zero to a maximum value as the point of user focus moves within the border region to said boundary;
c) Decreases to substantially zero as the point of user focus moves past said boundary.

11. In a computer interface comprising a representation of a personal space that is moveable by a user through a virtual space, wherein a user manipulates a pointer apparatus, which pointer apparatus is manipulable over a range of motion bounded by extremes thereof, to indicate whether the user is interfacing with the personal space or with the virtual space, a method of communicating to the user transitions therebetween comprising:
   a) determining the position of a representation of the pointer apparatus relative to a boundary between the personal space representation and virtual space; and
   b) applying force, directed substantially away from the boundary, to the pointer apparatus when the pointer object approaches the boundary;
   c) wherein the force is at a minimum when the pointer apparatus representation is distant from the boundary, and where the force is at a maximum when the pointer apparatus representation is near the boundary.

12. In a computer interface comprising a representation of a personal space moveable by a user through a virtual space, wherein a user manipulates a pointer apparatus to indicate whether the user is interfacing with the personal space or with the virtual space, where the pointer apparatus is manipulable over a range of motion bounded by extreme thereof, a method of communicating to the user transitions there between comprising:
   a) determining the position of a representation of the pointer apparatus relative to a boundary between the personal space representation and virtual space; and
   b) applying force, directed substantially away from the boundary, to the pointer apparatus when the pointer apparatus approaches the boundary;
   c) wherein, when the user is interfacing with the personal space, the boundary between the personal space representation and the virtual space corresponds to a region near a first extreme of the range of motion of the pointer apparatus, and, when the user is interfacing with the virtual space, the boundary between the personal space representation and the virtual space corresponds to a region near a second extreme of the range of motion of the pointer apparatus.

13. The method of claim 12 wherein the first extreme is substantially opposite the second extreme.

14. In a computer interface comprising a representation of a personal space moveable by a user through a virtual space, wherein a user manipulates a pointer apparatus to indicate whether the user is interfacing with the personal space or with the virtual space, a method of communicating to the user transitions therebetween comprising:
   a) determining the position of a representation of the pointer apparatus relative to a boundary between the personal space representation and virtual space; and
   b) applying force, directed substantially away from the boundary, to the pointer apparatus when the pointer object approaches the boundary;
   c) wherein the force is:
      i) Substantially zero when the representation of the pointer object is outside a border region corresponding to a region within a threshold distance from said boundary;
      ii) Increases from zero to a maximum value as the representation of the pointer object moves within the border region to said boundary;
      iii) Decreases to substantially zero as the representation of the pointer object moves past said boundary.

15. A method of interfacing between a computer and a user interacting with a plurality of domains separated by boundaries, wherein the interface comprises a representation of a three-dimensional space, and comprises a display characterized by a display plane presented to the user, wherein the user interacts with an active domain selected according to the position of a user locus of interaction, comprising:
   a) Determining the position of the user's locus of interaction relative to the boundaries, where the boundaries are substantially independent of the position of the locus relative to the display plane;
   b) Determining feedback forces from the position, the active domain, and the boundaries;
   c) Combining the feedback forces to determine a net feedback force;
   d) Applying the net feedback force to a user input device;
   e) If the locus moves past a boundary, then making the domain into which the locus moves the active domain and compensating for undesirable effects of the domain transition.

* * * * *